(12) United States Patent
Higashino

(10) Patent No.: US 6,788,739 B1
(45) Date of Patent: Sep. 7, 2004

(54) WAVEFORM EQUALIZING APPARATUS, METHOD OF OPTIMIZING WAVEFORM EQUALIZING APPARATUS AND DATA REPRODUCING APPARATUS

(75) Inventor: Satoru Higashino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/552,484

(22) Filed: Apr. 18, 2000

(30) Foreign Application Priority Data

Apr. 19, 1999 (JP) .......................................... 11-111222

(51) Int. Cl.[7] .............................. H03H 7/30; G11B 5/35
(52) U.S. Cl. .................................... 375/229; 375/232
(58) Field of Search ............................... 375/265, 232, 375/233, 341, 229

(56) References Cited

U.S. PATENT DOCUMENTS

| | | | | |
|---|---|---|---|---|
| 4,694,468 A | * | 9/1987 | Cullum ....................... | 375/224 |
| 5,550,683 A | * | 8/1996 | Koren ......................... | 360/46 |
| 5,579,340 A | * | 11/1996 | Tokuriki et al. ............. | 375/232 |
| 5,586,144 A | * | 12/1996 | Kahlman et al. ........... | 375/229 |
| 5,668,746 A | * | 9/1997 | Iwaki et al. ................. | 708/317 |
| 5,774,290 A | * | 6/1998 | Sasaki et al. ................. | 360/51 |
| 6,034,998 A | * | 3/2000 | Takashi et al. ............. | 375/294 |
| 6,067,198 A | * | 5/2000 | Zuffada et al. ............... | 360/46 |
| 6,144,951 A | * | 11/2000 | Dittmar et al. ............... | 706/13 |
| 6,563,889 B1 | * | 5/2003 | Shih et al. .................. | 375/232 |

* cited by examiner

*Primary Examiner*—Stephen Chin
*Assistant Examiner*—Lawrence Williams
(74) *Attorney, Agent, or Firm*—Frommer Lawrence & Haug LLP; William S. Frommer; Dennis M. Smid

(57) ABSTRACT

The present invention provides an excellent waveform equalization apparatus and its method realizing a PR1 equalizer reducing circuit scale and reducing power consumption. It is known that in a high frequency region proximate to Nyquist frequency, emphasis of an amplitude characteristic is smaller in Class 1 (PR1) than in Class 4 (PR4) of Partial Response. Hence, there is constituted a waveform equalizing apparatus satisfying PR1 equalization reference by a combination of an integrator for low frequency region emphasis and a filter constituted for PR4. By such a constitution, circuit scale can be reduced more than that of conventional PR1 equalizer and power consumption can be reduced.

3 Claims, 6 Drawing Sheets

WAVEFORM EQUALIZING APPARATUS, METHOD OF OPTIMIZING WAVEFORM EQUALIZING APPARATUS AND DATA REPRODUCING APPARATUS

BACKGROUND OF THE INVENTION

1. Field of the Invention

The present invention relates to a technology of reproducing data which is digitally recorded or digitally transmitted, particularly to a data reproducing system using PRML (Partial Response Maximum Likelihood) for executing partial response equalization suitable for a characteristic of a transmission path.

More in details, the present invention relates to an apparatus and a method of equalizing a waveform for reducing an equalization distortion by equalizing the waveform in a desired frequency characteristic, particularly to an apparatus and a method of equalizing a waveform for executing equalization by using PR1 (Partial Response Class 1) of a low frequency region emphasizing type to thereby realize accurate data detection.

2. Description of the Related Art

In the technical field of information processing, much data is handled after having been digitized. That is, softwares necessary for starting an information processing system or controlling operation thereof or data formed on the system are stored in a magnetic disk type recording apparatus such as a hard disk drive as a digitized file or are transmitted via a network such as LAN (Local Area Network) or the like. On the other hand, in order to reutilize data, analog waveform data read from a magnetic disk or analog waveform data received from a transmission path needs to digitally reproduce accurately.

Originally, in record data or transmission data, binary data comprising 0 and 1 is expressed in a square hit form. For example, in a magnetic disk type recording apparatus, data is reproduced by using a rise pulse and a fall pulse of a square wave by differentiating a signal read from a magnetic head. However, the rise and the fall pulse waves are accompanied by waveform rounding. When a recording density is promoted, an interval between the pulse waves becomes narrow by that amount and the pulse waveforms interfere with each other to thereby make difficult reproduction of data.

For example, due to an increase in the number and size of files handled by an information processing apparatus, the need for a large capacity formation and promotion of a record density with regard to a magnetic disk type recording apparatus such as a hard disk is required. The increase in the record density signifies a reduction in a volume of a magnetic member per bit of data. Accordingly, magnetic force is naturally reduced, a reproduced signal is weakened and noise is magnified relatively. Therefore, in the technical field of digital recording, a technology for accurately reproducing data from a weak reproduced signal becomes indispensable.

Such a problem of digital reproduction naturally exists not only in a digital recording apparatus but also in a digital communication apparatus.

In order to realize further accurate data reproduction, a technology referred to as so-to-speak PRML (Partial Response Maximum Likelihood) has been used widely. This is constituted by combining two data reproducing systems of a partial response system and a Viterbi decoding system. The partial response system provides equalization, that is, operation of neatly arranging a waveform of a reproduced signal. Further, the Viterbi decoding system is provided with maximum likelihood, that is, operation of reproducing data string which is mostly probable in view of the probability.

In an extremely simple expression, equalization of a waveform is realized by isolating respective pulse waves by exalting a high frequency component of a reproduced waveform. However, when the high frequency component is extremely exalted, in accordance therewith, rise at a low frequency is also amplified. Therefore, there has widely been adopted a system of permitting waveform interference partially, which is referred to as partial response.

The partial response is provided with a plurality of classes indicating equalization references of PR4 (Partial Response Class 4) and PR1 (Partial Response Class 1). PR4 is provided with an equalized frequency characteristic of (1−D) (1+D) and is expressed in an equivalent block diagram as shown by FIG. 6A. Further, PR1 is provided with an equalized frequency characteristic of (1+D) and is expressed in an equivalent block diagram as shown by FIG. 6B. Incidentally, shown in FIGS. 6A and 6B designates an operator expressing delay of 1 channel clock. Therefore, PR4 signifies (1−D) (1+D) =1−$D^2$, that is, a difference is calculated from a current component by square of a component forward by 1 clock, further, PR1 signifies to add the component forward by 1 clock to the current component.

It is general to constitute a PR4 equalizer by using a 7 pole 2 null equiripple filter. This is derived from that the equiripple filter is provided with a flat phase characteristic and setting of parameters is comparatively easy. With regard to the PR4 equalizer, for example, there is a description in "A 27 MHz Programmable Bipolar 0.05; Equiripple Linear-Phase Lowpass Filter" by Greet A. De Veirman et al, (1992 IEEE International Solid-State Circuits Conference).

In contrast thereto, PR1 equalization can arrange a waveform by reducing a degree of exalting a frequency component and is suitable for a magnetic disk having a high linear density, that is, high record density. Since PR1 executes a low frequency region emphasizing type equalization, conventionally, a PR1 equalizer is often constituted by combining an integral equalizer with a filter for emphasizing a high frequency region as well as attenuating a component at a vicinity of a Nyquist frequency, a filter for correcting group delay or the like.

However, in the case in which the PR1 equalizer is constituted by a combination of such many filters, it is not easy to flatten a phase at a high frequency region and accordingly, it is difficult to promote the equalization characteristic. Further, although a degree of freedom is enhanced by an amount of increasing parameters, on the other hand, it is very difficult to set optimum parameters.

According an example of a conventional PR1 equalizer, the PR1 equalizer is constituted by a combination of a highpass filter and a 6-th order lowpass filter. In this industry, generally, an amount of calculation for setting parameters of a circuit is expanded exponentially in accordance with an order degree provided to the circuit and it is very difficult to calculate an optimum solution of such an high order PR1 equalizer. Further, a circuit for constituting the equalizer becomes large-scaled in accordance with the order degree and power consumption is increased by that amount.

SUMMARY OF THE INVENTION

In order to realize application of a PR1 equalizer suitable for a high linear density to a data reproducing apparatus, this must be realized by a simple circuit constitution. Further, it seems to be necessary that optimum parameter setting of PR1 equalization is calculated easily in accordance with a simple algorism.

It is an object of the present invention to provide an excellent data reproducing system using PRML (Partial Response Maximum Likelihood) for executing partial response equalization suitable for a characteristic of a transmission path.

It is a further object of the present invention to provide an excellent waveform equalizing apparatus and its method for enabling accurate data detection by reducing equalization distortion by equalizing a waveform to a desired frequency characteristic.

It is a further object of the present invention to provide an excellent waveform equalizing apparatus and its method for executing equalization by using PR1 (Partial Response Class 1) of a low frequency region emphasizing type.

It is a further object of the present invention to provide an excellent waveform equalizing apparatus and its method for reducing a circuit scale and realizing a PR1 equalizer by reducing power consumption.

The present invention has been carried out in consideration of the above-described problem and a first aspect thereof is a waveform equalizing apparatus for equalizing an input waveform to an equalization reference of Partial Response Class 1, wherein a phase variation at a high frequency region is prevented by executing emphasis of the high frequency region and steep attenuation at a vicinity of a Nyquist frequency by using a phase flat filter.

By positively utilizing the operational characteristic of the phase flattening filter which is one of constituent elements of the waveform equalizing apparatus, while restraining the phase variation of the input waveform at the high frequency region, emphasis of the high frequency region and the steep attenuation at the vicinity of the Nyquist frequency can be realized.

Further, a second aspect of the present invention is a phase equalizing apparatus which equalizes an input waveform to an equalization reference of Partial Response Class 1 by a combination of an integrator for emphasizing a low frequency region and an equalizer for equalizing to an equalization reference of Partial Response Class 4.

It is known that in the high frequency region at the vicinity of the Nyquist frequency, emphasis of the amplitude characteristic is known to be smaller in Class 1 (PR1) than in Class 4 (PR4) of partial response. Hence, in the case of the waveform equalizing apparatus according to the second aspect of the present invention, the waveform equalizing apparatus satisfying the PR1 equalization reference is constituted by the combination of the integrator for emphasizing the low frequency region and the filter constituted for PR4. By such a constitution, the circuit scale is reduced more than in the conventional PR1 equalizer and power consumption can further be reduced.

Further, a third aspect of the present invention is a method of optimizing a waveform equalizing apparatus having an equalization reference of Partial Response Class 1 constituted by a combination of an integrator for emphasizing a low frequency region and an equalizer for equalizing to an equalization reference of Partial Response Class 4, which individually optimizes respective parameters of the integrator and the equalizer, and a waveform equalizing apparatus optimized by the optimizing method.

The conventional Partial Response Class 1 (PR1) equalizing apparatus is constituted by a combination of many filters and therefore, a number of parameters to be set is large and optimization is difficult. Further, flattening of high frequency phase is not easy and it is difficult to promote equalization characteristic. In contrast thereto, according to the third aspect of the present invention, by facilitating flattening of the high frequency phase by using the PR4 equalizer and individually optimizing the respective parameters of the integrator and the equalizer, calculation load for setting the parameters can be alleviated.

Further, a fourth aspect of the present invention is a method of optimizing a waveform equalizing apparatus having an equalization reference of Partial Response Class 1 constituted by a combination of an integrator for emphasizing a low frequency region and an equalizer for equalizing to an equalization reference of Partial Response Class 4, comprising:

a first step of optimizing a parameter provided to the equalizer to satisfy the equalization reference of Partial Response Class 4; and a second step of optimizing a parameter provided to the integrator by using the parameter optimized by the first step, and a waveform equalizing apparatus optimized by the optimizing method.

According to the fourth aspect of the present invention, flattening of the high frequency region phase is facilitated by using the PR4 equalizer, a total of the waveform equalizing apparatus is optimized in accordance with a procedure of firstly optimizing the parameter provided to the PR4 equalizer and successively optimizing the parameter provided to the integrator and accordingly, the calculation load for setting the parameters can be alleviated.

More specifically, the waveform equalizing apparatus according to the aspect is constituted by five parameters of a cutoff frequency of the low frequency region removing filter, gain and a cutoff frequency of the integrator and a boost amount and a cutoff frequency of the equiripple equalizer for PR4. Although a solution is not converged when all of the parameters are intended to optimize simultaneously, by following the above-described procedure, the equalizing apparatus having a desired characteristic can be provided by a comparatively small calculation amount.

Further, a fifth aspect of the present invention is a method of optimizing a waveform equalizing apparatus having an equalization reference of Partial Response Class 1 constituted by a combination of an integrator for emphasizing a low frequency region and an equalizer for equalizing to an equalization reference of Partial Response Class 4, comprising:

a first step of optimizing a parameter provided to the equalizer to satisfy the equalization reference of Partial Response Class 4;

a second step of optimizing a parameter provided to the integrator by using the parameter optimized by the first step; and a third step of further optimizing the parameter provided to the equalizer by using the parameter optimized by the second step, and a waveform equalizing apparatus optimized by the optimizing method.

According to the fifth aspect of the present invention, flattening of the high frequency region phase is facilitated by using the PR4 equalizer and firstly, the parameter provided to the PR equalizer is optimized, successively, the parameter provided to the integrator is optimized and thereafter, the parameter provided to the PR4 equalizer is further optimized. As a result, higher equalization characteristic can be realized.

Further, a sixth aspect of the present invention is a program providing medium which is a program providing medium for materially providing a computer program operated on a computer system, comprising:

a first step of optimizing a parameter provided to the equalizer to satisfy the equalization reference of Partial Response Class 4; and a second step of optimizing a parameter provided to the integrator by using the parameter optimized by the first step;

for optimizing a waveform equalizing apparatus having an equalization reference of Partial Response Class 1 constituted by a combination of an integrator for emphasizing a low frequency region and an equalizer for equalizing to an equalization reference of Partial Response Class 4.

The sixth aspect of the present invention is the program providing medium for materially providing the computer program for realizing the method of optimizing a waveform equalizing apparatus according to the fourth aspect to the computer system. That is, there is defined a cooperative relationship between the computer program and the provided medium in view of structure or in view of function, in other words, by introducing the computer program to the computer system, the cooperative relationship is achieved on the computer system and operation and effect similar to that in the fourth aspect of the present invention can be achieved.

A seventh aspect of the present invention is a program providing medium which is a program providing medium for materially providing a computer program operated on a computer system, comprising:

a first step of optimizing a parameter provided to the equalizer to satisfy the equalization reference of Partial Response Class 4;

a second step of optimizing a parameter provided to the integrator by using the parameter optimized by the first step; and a third step of further optimizing the parameter provided to the equalizer by using the parameter optimized by the second step;

for optimizing a waveform equalizing apparatus having an equalization reference of Partial Response Class 1 constituted by a combination of an integrator for emphasizing a low frequency region and an equalizer for equalizing to an equalization reference of Partial Response Class 4.

The seventh aspect of the present invention is the program providing medium materially providing the computer program for realizing the method of optimizing the waveform equalizing apparatus according to the fifth aspect to the computer system. That is, there is defined a cooperative relationship between the computer program and the provided medium in view of structure or in view of function and by introducing the computer program to the computer system, operation and effect similar to that in the fifth aspect of the present invention can be achieved.

Further, an eighth aspect of the present invention is a data reproducing apparatus constituted by inputting means for inputting a waveform data to be reproduced, waveform equalizing means for equalizing an input waveform to an equalization reference of Partial Response Class 1 and data detecting means for detecting data from an equalized waveform, wherein:

the waveform equalizing means prevents a phase variation at a high frequency region by executing emphasis of the high frequency region and steep attenuation at a vicinity of a Nyquist frequency by using a phase flat filter.

The eighth aspect of the present invention is the data reproducing apparatus constituted by using the waveform equalizing apparatus according to the first aspect and higher equalization characteristic is realized.

Further, a ninth aspect of the present invention is a data reproducing apparatus constituted by inputting means for inputting a waveform data to be reproduced, waveform equalizing means for equalizing an input waveform to an equalization reference of Partial Response Class 1 and data detecting means for detecting data from an equalized waveform, wherein:

the waveform equalizing means is constituted by a combination of an integrator for emphasizing a low frequency region and an equalizer for equalizing to an equalization reference of Partial Response Class 4.

The ninth aspect of the present invention is the data reproducing apparatus constituted by using the waveform equalizing apparatus according to the second aspect and higher equalization characteristic is realized.

Still other objects, characteristics and advantages of the present invention will become apparent by a further detailed description based on embodiments and attached drawings of the present invention, mentioned later.

DESCRIPTION OF THE PREFERRED EMBODIMENTS

A detailed explanation will be given of embodiments of the present invention in reference to the drawings as follows.

Figure 1:
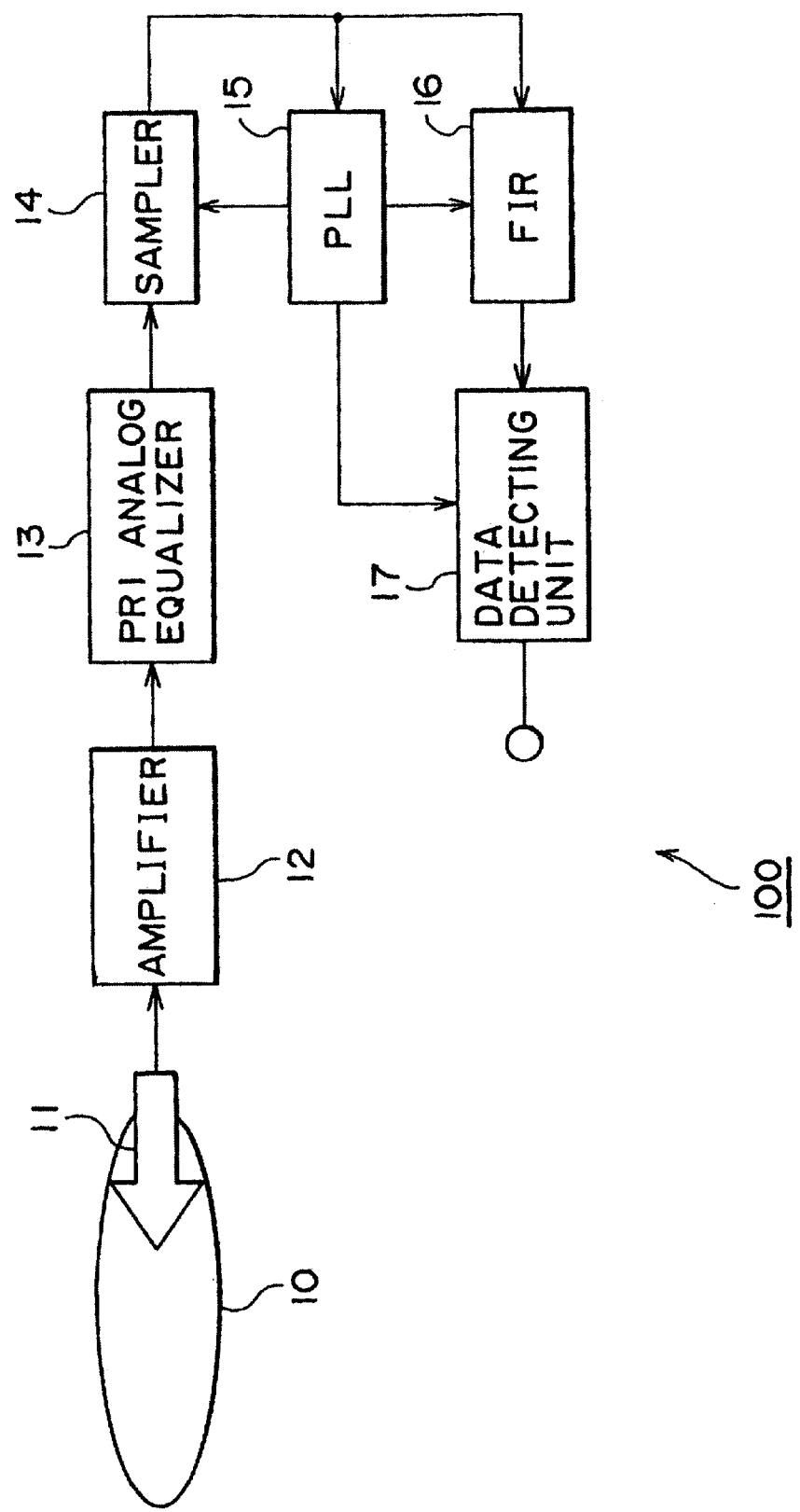
FIG. 1 is a diagram schematically showing a hardware constitution of a digital magnetic disk recording/reproducing apparatus 100 to which the present invention is applied.

FIG. 1 schematically shows a hardware constitution of a digital magnetic disk recording/reproducing apparatus as an embodiment to which the present invention is applied. As shown by the drawing, the recording/reproducing apparatus 100 is constituted by a magnetic disk 10, a magnetic head 11, an amplifier 12, a PR1 analog equalizer 13, a sampler 14, PLL 15, FIR 16 and a data detecting unit 17. An explanation will be given of respective portions as follows.

Data is magnetically recorded on the magnetic disk 10 in a bit string style. The magnetic head 11 reads data from above the magnetic disk 10 and inputs the data to the amplifier 12 as a reproduced signal in an analog waveform shape. The amplifier 12 amplifies the analog signal and supplies the analog signal to the equalizer 13.

The equalizer 13 according to the embodiment carries out equalization of PR1 (Partial Response Class 1). The equalizer 13 is constituted as a steep high frequency cut filter for satisfying the Nyquist second reference by emphasizing a low frequency component of the waveform reproduced by the magnetic head 11 and emphasizing a high frequency region component to a certain degree. Incidentally, a description will be given later of the details of the equalizer 13.

An output signal of the equalizer 13 is supplied to the sampler 14 and sampling of the signal is carried out. PLL (Phase Lock Loop) 15 extracts a channel clock based on the sampled signal and supplies the sampled signal to the sampler 14, FIR 16 and the data detector 17 to thereby operate these synchronously.

FIR 16 carries out further equalization in order to promote a data detecting function. However, the equalizing processing at FIR 16 does not constitute the gist of the present invention. Further, the data detector 17 outputs bit string data by detecting the recorded bit string. One example of the data detector 17 is a Viterbi detector.

Next, a detailed explanation will be given of the equalizer 13. The equalizer 13 is constituted as the steep high frequency region cutoff filter for satisfying the Nyquist second reference by emphasizing the low frequency region component of the waveform reproduced by the magnetic head 11 and emphasizing the high frequency region component to a certain degree (as mentioned above). However, unless the phase characteristic is as flat as possible, the group delay is disturbed and the equalization characteristic of the waveform is deteriorated. Hence, as explained below, although according to the equalizer 13 of the embodiment, the low frequency phase is influenced since the low frequency region component is emphasized by using a first order analog integrator, the low frequency region emphasizing component restrains disturbance of the group delay at the high frequency region by a phase flat filter.

Figure 2:
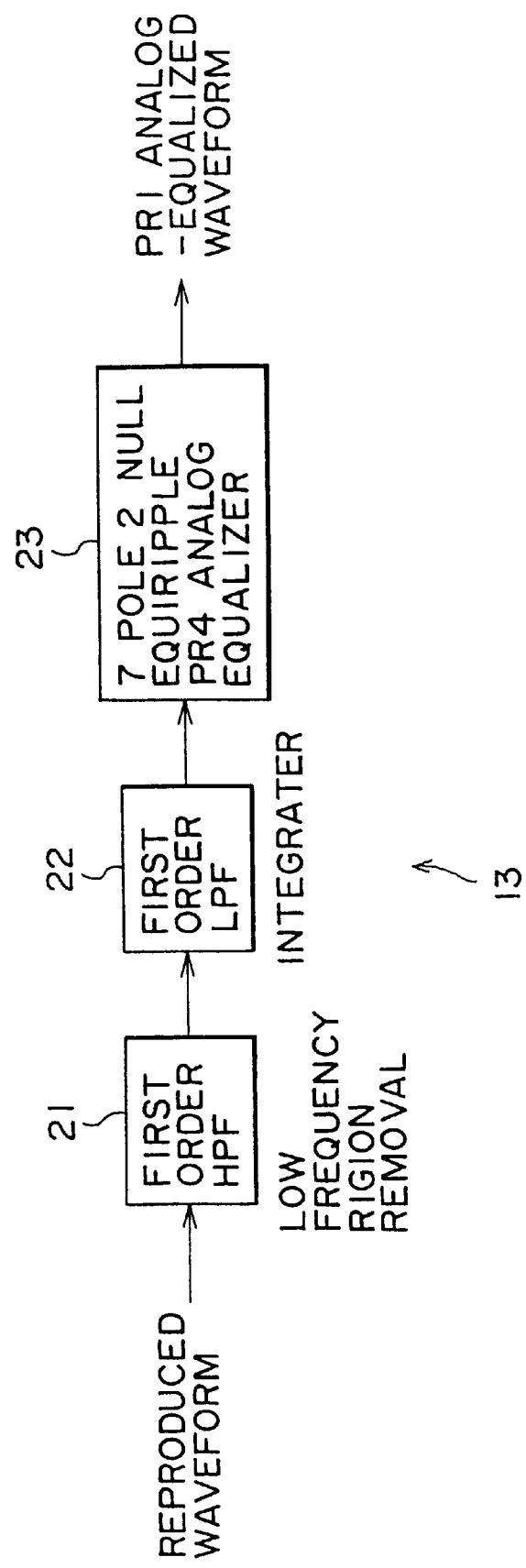
FIG. 2 is a diagram schematically showing a constitution of a PR1 equalizer 13 according to the embodiment.

The equalizer 13 according to the embodiment carries out equalization satisfying the PR1 equalization reference and is featured mainly in being constituted by utilizing the PR4 equalizer. FIG. 2 schematically shows the constitution of the PR1 analog equalizer 13 according to the embodiment. As shown by the drawing, the equalizer 13 is constituted by connecting in series a first order highpass filter 21, a first order lowpass filter 22 and a PR4 equalizer 23. An explanation will be given of respective portions as follows.

The first order highpass filter 21 carries out low frequency removal in the reproduced waveform and restrains a low frequency component which is not outputted from the magnetic head 11 from being emphasized unnecessarily in the successive processing.

The first order lowpass filter 22 is provided with operation of restraining a high frequency emphasizing amount in an equalized component outputted from the successive PR4 equalizer 23 by emphasizing a low frequency region component which needs PR1 equalization and is constituted by an integrator for emphasizing a low frequency region.

The PR4 equalizer 23 is a circuit for realizing equalization of a so-to-speak class 4 and is constituted by a 7 pole 2 null equiripple filter according to the embodiment. The transfer function of the 7 pole 2 null equiripple PR4 analog equalizer 23 is shown by following Equation 1 in Laplace-transformed expression.

$$F(s) = \frac{\omega_1^2 - Ks^2}{s^2 + \frac{\omega_1}{Q_1}s + \omega_1^2} \cdot \frac{\omega_2^2}{s^2 + \frac{\omega_2}{Q_2}s + \omega_2^2} \cdot \frac{\omega_3^2}{s + \frac{\omega_2}{Q_3}s + \omega_2^2} \cdot \frac{\omega_4}{s + \omega_4} \quad \text{Equation 1}$$

In the case of the characteristic constituting the low frequency region removing filter as a premise, among variables included in the above-described transfer function, respectives of characteristic coefficients and pole frequencies $\omega_1$, $\omega_2$, $\omega_3$, $\omega_4$, $Q_1$, $Q_2$, $Q_3$ are normalized by a cutoff frequency. Table 1 shows an example of normalizing these variables:

TABLE 1

| | | | |
|---|---|---|---|
| $\omega_1$ | 1.14762 | $Q_1$ | 0.6811 |
| $\omega_2$ | 1.71796 | $Q_2$ | 1.11409 |
| $\omega_3$ | 2.31740 | $Q_3$ | 2.02290 |
| $\omega_4$ | 0.86133 | | |

Therefore, in order to optimize the output characteristic of the 7 pole 2 null equiripple PR4 analog equalizer 23 to be proximate to a desired frequency characteristic of PR4, only two variables of the cutoff frequency and K may be searched. In this case, the calculation load becomes far smaller than in the case in which optimum parameters of a 6-th order lowpass filter is searched explained in the column of the [Prior Art]

It has already been found in the industry that the cutoff frequency of the first order highpass filter 21 for removing the low frequency region is suitable to be about one thirty-second of the Nyquist frequency in consideration of application to PR1. Therefore, the gain is set to 1.0.

The calculation load of the processing of optimizing the parameter provided to the first order lowpass filter 22 constituted by the integrator when the parameter of the PR4 equalizer 23 which has once being optimized is fixed. That is, when only two parameters of gain and cutoff frequency of the integrator 22 are searched, the frequency characteristic with regard to a total of the PR1 equalizer 13 can be optimized to be proximate to the desired frequency characteristic of PR1.

When the frequency characteristic of the PR1 equalizer 13 is intended to promote, in this case, the optimized parameter of the integrator 22 may be fixed and two parameters of the cutoff frequency and K may be searched again with regard to the PR4 equalizer 23.

Further, the above-described optimization processing procedure is realized by using "Fletcher-Powell" method which is known as a nonlinear optimizing method. In the primary search, phase characteristic and amplitude characteristic are made to conform to ideal equalization characteristics by using three degree polynomial interpolation.

Further, as a model of the magnetically recorded/reproduced waveform, dipulse response is expressed by Lorenz function shown by following Equation 2 and a value provided by dividing a half value width a by a frequency Ts of the channel clock is set to an index of a density and is defined as NLD (Normalized Linear Density).

$$f(t) = \frac{A}{1+\left(\frac{2t}{a}\right)^2} \qquad \text{Equation 2}$$

Figure 3:
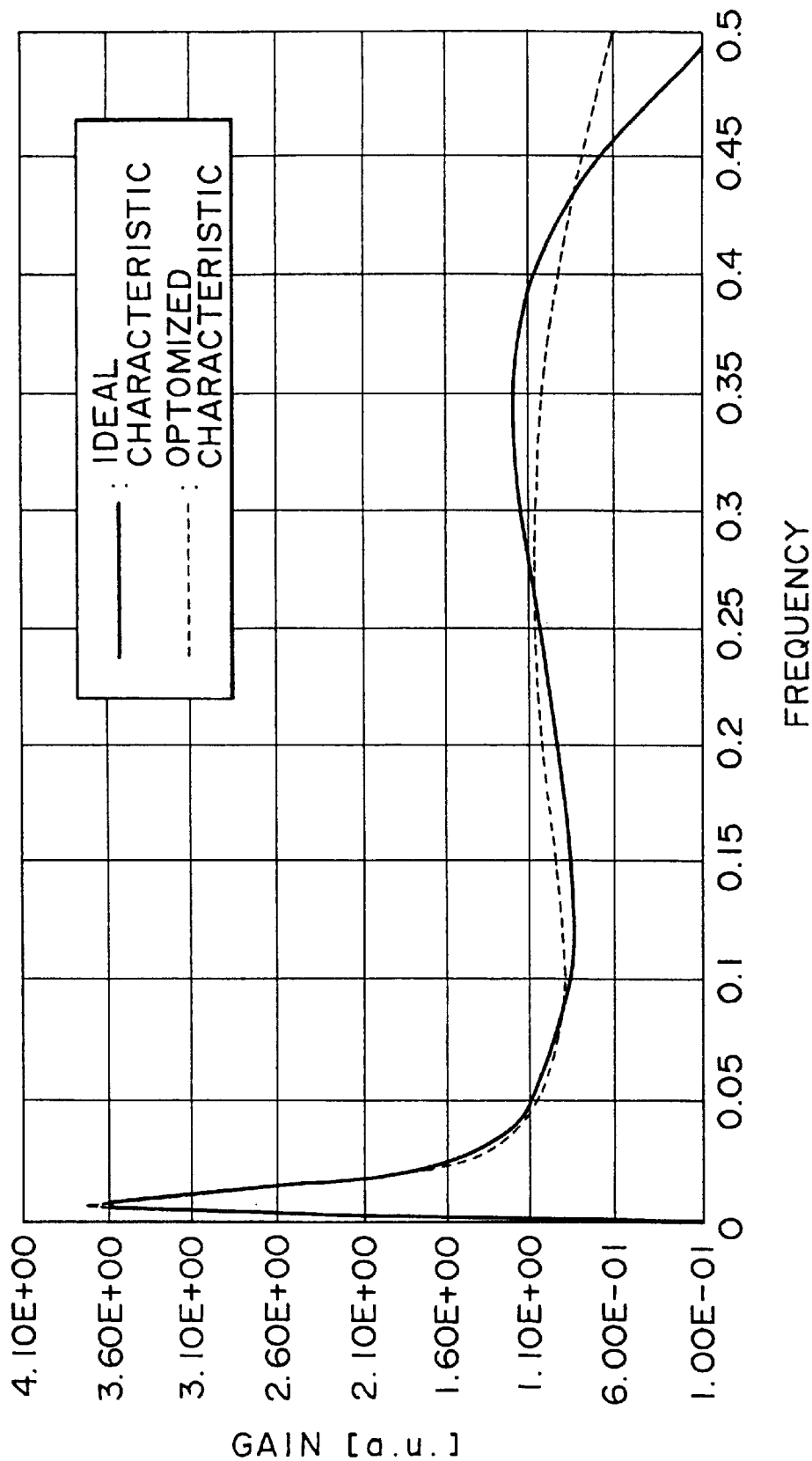
FIG. 3 is a diagram showing an amplitude characteristic in which only an amplitude function is made to constitute an evaluation function for optimizing and the optimizing is carried out with regard to NLD=2.8 by using [Equation 3].

FIG. 3 shows amplitude characteristics when optimization is carried out with regard to NLD=2.8 by using following Equation 3 as an evaluation function for optimizing only an amplitude function.

$$\varepsilon^2 = \sum_{\omega=\omega_0}^{\omega_1} |F'^2(\omega) - F^2(\omega)|^2 \qquad \text{Equation 3}$$

Incidentally, in Equation 3, F' ($\omega$) designates an object amplitude function and F($\omega$) designates an amplitude function of an analog equalizer to be optimized. That is, Equation 3 signifies to conform to an ideal characteristic to a certain degree.

Figure 4:
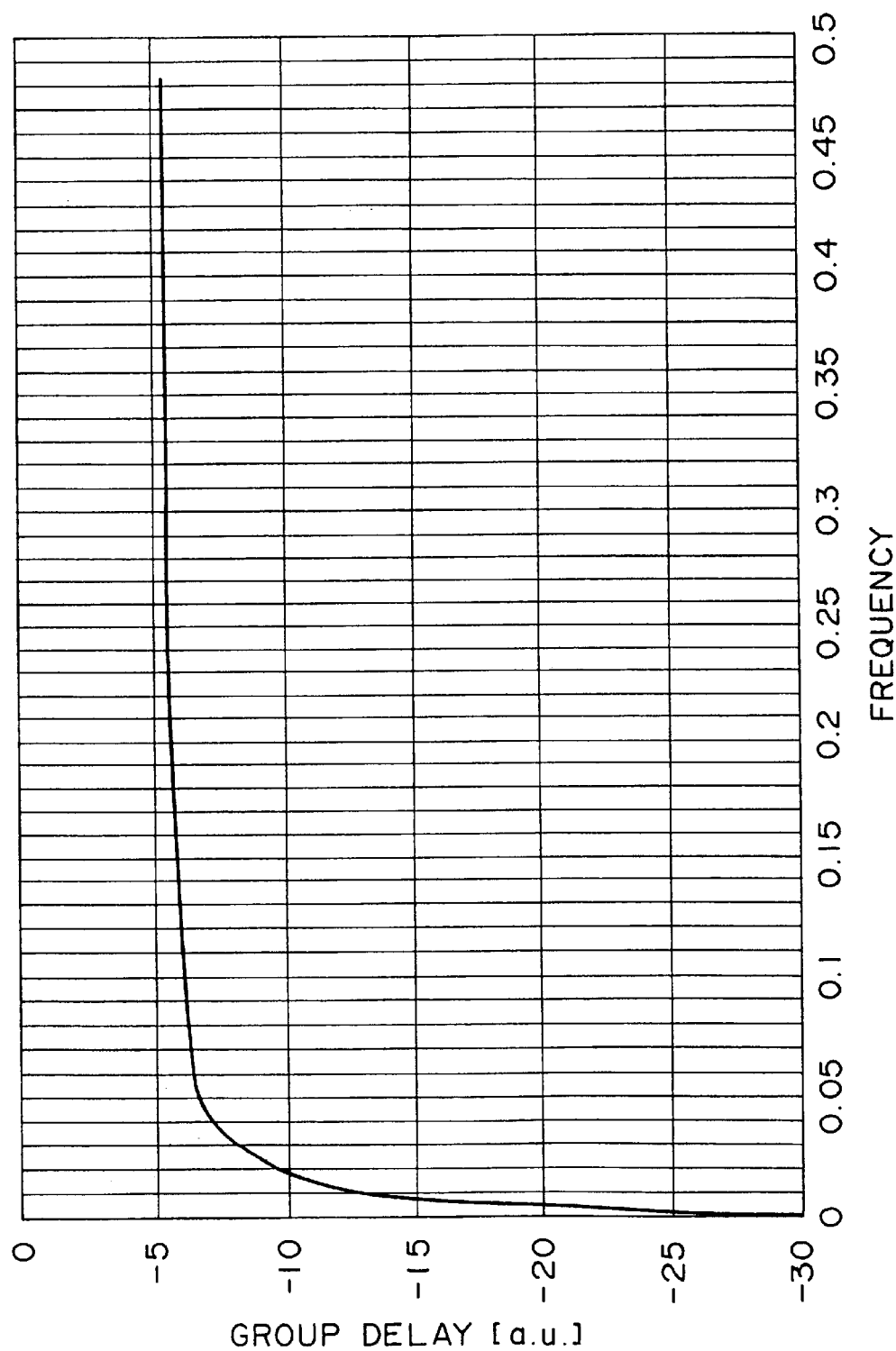
FIG. 4 is a diagram showing a group delay characteristic of an optimized PR1 equalizing apparatus.

FIG. 4 shows a group delay characteristic of the optimized PR1 equalizing apparatus. As shown by the drawing, it can be understood that although the group delay at the low frequency region is disturbed, a flat characteristic is provided at a high frequency region.

When all the parameters provided to the PR1 equalizer 13 are intended to optimize simultaneously, the solution is not converged adequately. Further, in optimizing the parameter provided to the PR4 equalizer 23, when the cutoff frequency and K are intended to optimize simultaneously, there is a tendency in which the parameter is converged to a local minimum solution which is not regarded as optimum.

Figure 5:
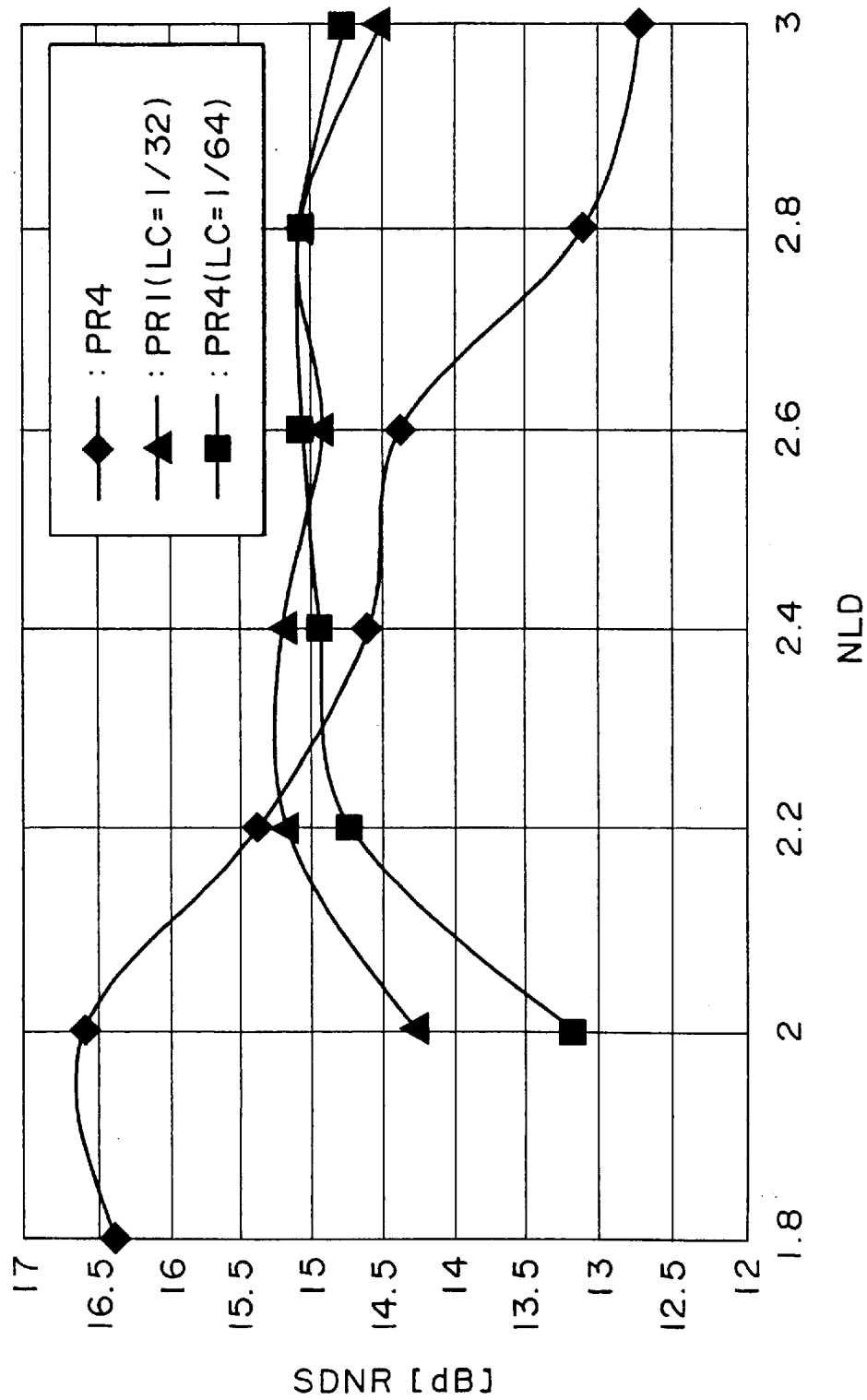
FIG. 5 is a diagram showing a simulation result of SDNR (Signal and Distortion to Noise Ratio) of the waveform equalizing apparatus 13 according to the embodiment.
Figure 6A:
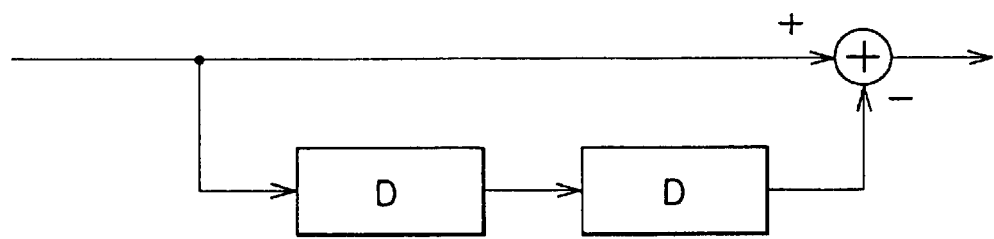
FIGS. 6A and 6B illustrate equivalent block diagrams of PR4 and PR1.
Figure 6B:
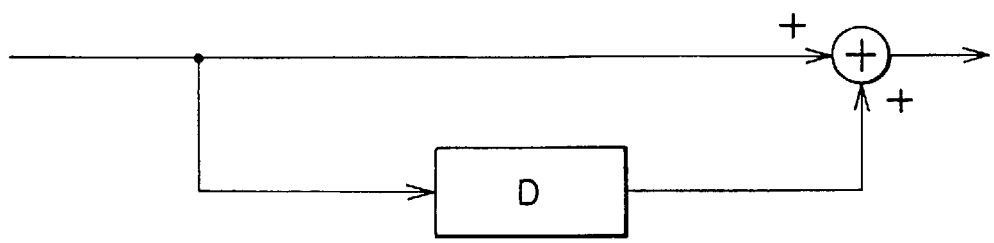

FIG. 5 shows a simulation result of SDNR (Signal and Distortion to Noise Ratio) in the case of optimizing the total of the waveform equalizing apparatus 13 in accordance with a procedure of firstly optimizing the parameter provided to the PR4 equalizer 23 and successively optimizing the parameter provided to the integrator 22. SDNR referred to here, prescribes a rate of noise to equalization distortion with regard to a reference signal level value as a result of calculating and equalizing the parameter at intervals of 0.2 in NLD=2.0 through 3.0. However, the Lorenz waveform is superposed with white Gaussian noise of 25 dB.

FIG. 5 shows charts of setting the cutoff frequency of the lowpass removing filter to one thirty-second and one sixty-fourth of the Nyquist frequency. Further, for reference, there is also shown a chart of a result of PR4 equalization of the optimized PR4 equalizer 23.

Generally, the PR1 equalization characteristic exceeds the characteristic of PR4 from around NLD=2.4 and as is apparent from the equalization characteristic of FIG. 5, the general characteristic is achieved also by the PR1 analog equalizer 13 according to the embodiment.

As mentioned above, a detailed explanation has been given of the present invention in reference to specific embodiments. However, it is self-evident that a skilled person can carry out modification or substitution of the embodiments within a range not deviated from the gist of the present invention. That is, the present invention has been disclosed in a mode of exemplification and is not to be interpreted limitedly. In order to determine the gist of the present invention, a reference must be given to the scope of claims described below.

What is claimed is:

1. A method of optimizing a waveform equalizing apparatus having an equalization reference of Partial Response Class 1 constituted by a combination of an integrator for emphasizing a low frequency region and an equalizer for equalizing to an equalization reference of Partial Response Class 4, which comprises:

a first step of optimizing a parameter provided to the equalizer to satisfy the equalization reference of Partial Response Class 4;

a second step of optimizing a parameter provided to the integrator by using the parameter optimized by the first step; and a third step of further optimizing the parameter provided to the equalizer by using the parameter optimized by the second step.

2. A waveform equalizing apparatus which is optimized by the method of optimizing a waveform equalizing apparatus according to claim 1.

3. A program providing medium which is a program providing medium for materially providing a computer program operated on a computer system, comprising:

a first step of optimizing a parameter provided to the equalizer to satisfy the equalization reference of Partial Response Class 4;

a second step of optimizing a parameter provided to the integrator by using the parameter optimized by the first step; and a third step of further optimizing the parameter provided to the equalizer by using the parameter optimized by the second step;

for optimizing a waveform equalizing apparatus having an equalization reference of Partial Response Class 1 constituted by a combination of an integrator for emphasizing a low frequency region and an equalizer for equalizing to an equalization reference of Partial Response Class 4.

\* \* \* \* \*